United States Patent
Lim et al.

(10) Patent No.: US 10,846,830 B2
(45) Date of Patent: Nov. 24, 2020

(54) DISPLAY APPARATUS AND CONTROL METHOD THEREOF

(71) Applicant: SAMSUNG ELECTRONICS CO., LTD., Suwon-si (KR)

(72) Inventors: Hyung-jun Lim, Seoul (KR); Seok-bong Yoo, Suwon-si (KR); Tae-gyoung Ahn, Yongin-si (KR); Young-su Moon, Seoul (KR); Seong-hoon Choi, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/640,611

(22) PCT Filed: May 18, 2018

(86) PCT No.: PCT/KR2018/005691
§ 371 (c)(1),
(2) Date: Feb. 20, 2020

(87) PCT Pub. No.: WO2019/045227
PCT Pub. Date: Mar. 7, 2019

(65) Prior Publication Data
US 2020/0175653 A1  Jun. 4, 2020

(30) Foreign Application Priority Data
Aug. 30, 2017  (KR) .................. 10-2017-0110239

(51) Int. Cl.
*G06T 5/20* (2006.01)
*G06T 5/00* (2006.01)

(52) U.S. Cl.
CPC ............... *G06T 5/003* (2013.01); *G06T 5/20* (2013.01)

(58) Field of Classification Search
CPC .................. G06T 5/003; G06T 5/20
(Continued)

(56) References Cited

U.S. PATENT DOCUMENTS 7,126,643 B2    10/2006  Song et al.
2004/0126037 A1*  7/2004  Kim ................... G06T 3/4007
                                                       382/300

(Continued)

FOREIGN PATENT DOCUMENTS

JP     2002-118737 A    4/2002
JP     4479600 B2       6/2010
(Continued)

OTHER PUBLICATIONS

International Search Report dated Sep. 21, 2018 issued by the International Searching Authority in counterpart International Application No. PCT/KR2018/005691 (PCT/ISA/210).
(Continued)

*Primary Examiner* — Jin Ge
(74) *Attorney, Agent, or Firm* — Sughrue Mion, PLLC

(57) ABSTRACT

Disclosed is a display apparatus including: a signal receiver configured to receive an image signal; a display configured to display an image; a processor configured to: calculate a change degree and a change direction of pixel value differences between at least one first pixel and two or more second pixels of an image, and change a pixel value of the first pixel based on the pixel value difference which is relatively small among the pixel values differences obtained by the calculated change degree and the calculated change direction.
According to this, it is possible to enhance the image details without generating or and increasing of the noises.

13 Claims, 20 Drawing Sheets

(58) Field of Classification Search
USPC .......................................................... 345/619
See application file for complete search history.

(56) References Cited

U.S. PATENT DOCUMENTS

| | | | | |
|---|---|---|---|---|
| 2004/0135926 | A1* | 7/2004 | Song | H04N 7/012 348/448 |
| 2004/0257475 | A1* | 12/2004 | Kim | G06T 3/4007 348/581 |
| 2006/0245666 | A1* | 11/2006 | Petrosyan | G06T 5/002 382/275 |
| 2007/0002154 | A1* | 1/2007 | Kang | H04N 9/045 348/272 |
| 2007/0052845 | A1* | 3/2007 | Adams | H04N 5/142 348/452 |
| 2007/0230808 | A1* | 10/2007 | Kimura | G06K 9/4609 382/240 |
| 2008/0298714 | A1* | 12/2008 | Lee | G06T 5/002 382/266 |
| 2009/0316024 | A1* | 12/2009 | Noh | G06T 5/20 348/252 |
| 2010/0054622 | A1* | 3/2010 | Adams | G06T 3/403 382/269 |
| 2014/0010478 | A1* | 1/2014 | Ndiour | G06T 3/4007 382/300 |

FOREIGN PATENT DOCUMENTS

| | | |
|---|---|---|
| JP | 2010-157163 A | 7/2010 |
| JP | 2012-169700 A | 9/2012 |
| JP | 2015-162759 A | 9/2015 |
| JP | 6352617 B2 | 7/2018 |
| KR | 10-0440974 B1 | 7/2004 |
| KR | 10-2004-0085891 A | 10/2004 |
| KR | 10-0505663 B1 | 8/2005 |
| KR | 10-0532121 B1 | 11/2005 |
| KR | 10-0565065 B1 | 3/2006 |
| KR | 10-2007-0035800 A | 4/2007 |
| KR | 10-1481551 B1 | 1/2015 |
| KR | 10-2015-0090455 A | 8/2015 |

OTHER PUBLICATIONS

Japanese Office Action dated Sep. 10, 2019 issued by the Japanese Patent Office in counterpart Japanese Application No. 2019-511603.
Japanese Office Action dated Jan. 28, 2020 issued by the Japanese Patent Office in counterpart Japanese Application No. 2019-511603.

* cited by examiner

FIG. 13
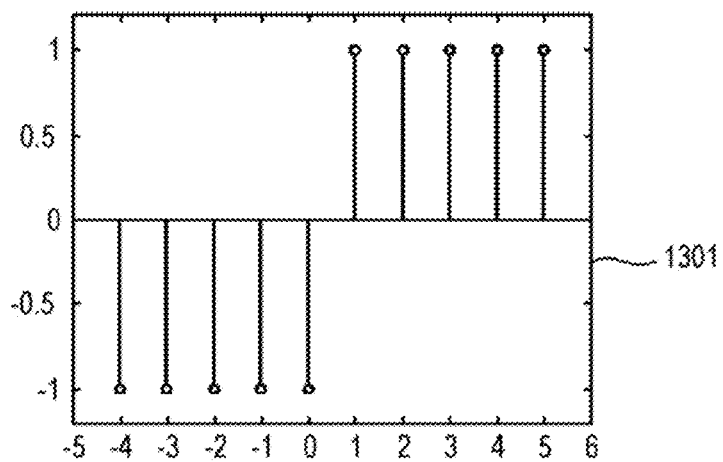
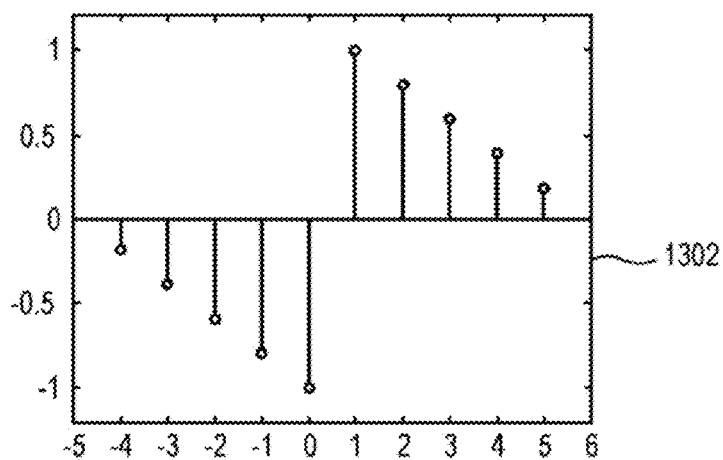
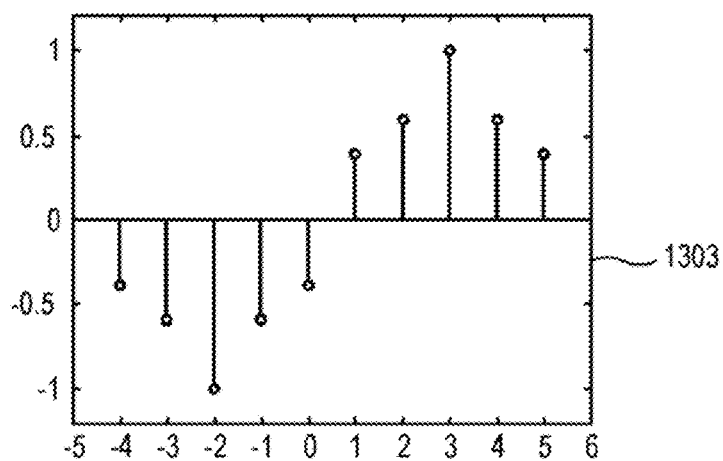

FIG. 16
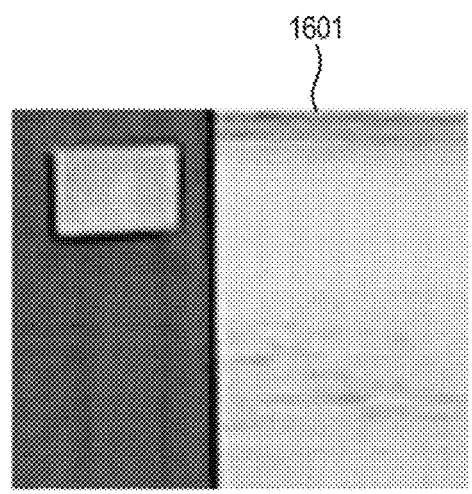
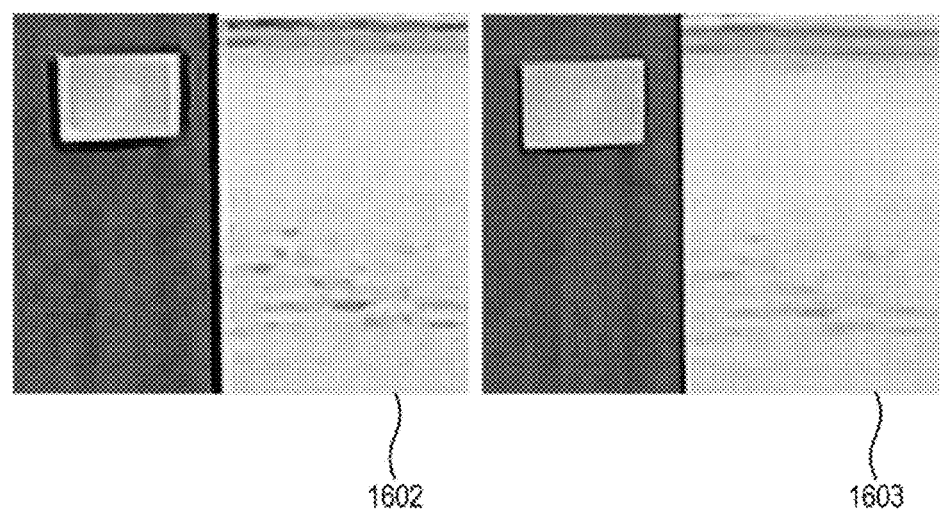

FIG. 20
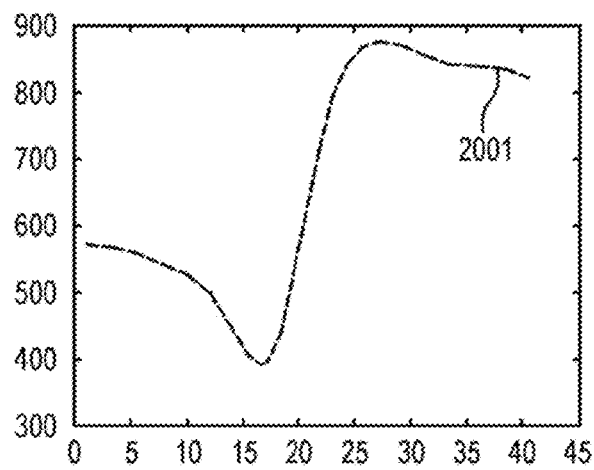
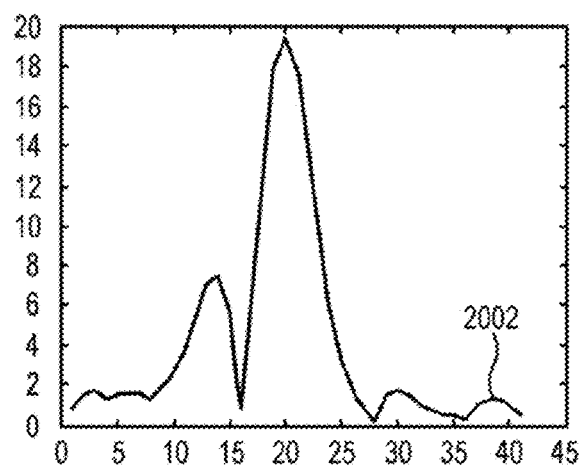
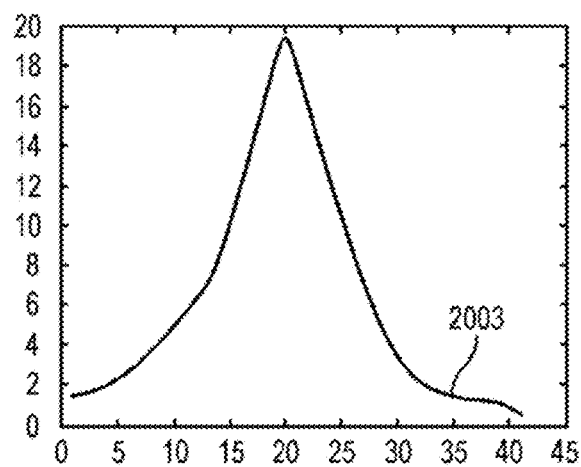

DISPLAY APPARATUS AND CONTROL METHOD THEREOF

TECHNICAL FIELD

The disclosure relates to a display apparatus and a control method thereof, and more particularly to the display apparatus and the control method thereof to change an image with enhanced details.

BACKGROUND ART

Image detail enhancement clarifies objects in an image or makes them distinct by allowing transition of an image signal fast, increasing variation of a magnitude thereof, etc. It is increasingly important to enhance the image details as a size of a display apparatus becomes large. This is because it gets more needed to clarify an image which has became blur in a process of enlarging the image to match a large-sized display.

Unsharp filtering is a representative technique to enhance the image details. The unsharp filtering has been used a long time because of its simple implementation and good effectiveness.

The principle of the unsharp filtering is to obtain middle and high frequency components of an input signal using a low pass filter and amplify the obtained frequency components. Referring to FIG. 4, the unsharp filtering is performed by obtaining a low frequency component of an input signal using a low pass filter 401, which allows only the low frequency component to pass through, where a high frequency component of the input signal is removed, that is, the image details are reduced, calculating difference between the input signal and a low frequency signal output from the low pass filter 401 at operation 402, adding the calculated difference with gain to the input signal at operation 403 and obtaining an output signal. In other words, the unsharp filtering amplifies the high frequency component of the image.

FIG. 5 illustrates a relationship between the input signal and the output signal which are applied with the unsharp filtering according to an embodiment of the disclosure. It shows that middle portions of the output signal are temporarily smaller or larger than those of the input signal before and after transition, respectively (501, 502; it is referred to as 'overshoot'). That is, the overshoots occur when the image details are enhanced with the unsharp filtering.

The overshoots 501 and 502 have a problem in that overall image qualities are reduced. This is because noises that are included in the overshoots 501 and 502 are also amplified together with the signal. In other words, there is a problem of amplifying the noises as well when the image details are enhanced with the unsharp filtering. Therefore, it is very important in the image detail enhancement to prevent from generating and increasing of the noises.

DISCLOSURE

Technical Problem

Accordingly, an object of the disclosure is to provide a display apparatus and a control method thereof enhancing the image details without generating and increasing of the noises.

Further, another object of the disclosure is to provide a display apparatus and a control method thereof in a practical and economical way.

Technical Solution

According to an embodiment of the disclosure, the object is achieved by providing a display apparatus including: a signal receiver configured to receive an image signal; a display configured to display an image; a processor configured to: calculate a change degree and a change direction of pixel value differences between at least one first pixel and two or more second pixels of an image, and change a pixel value of the first pixel based on the pixel value difference which is relatively small among the pixel value differences obtained by the calculated change degree and the calculated change direction.

The processor may be further configured to: identify, based on the calculated change degree and the calculated change direction of the pixel value differences, a pixel which is placed in a direction where the pixel value differences decrease, and change the pixel value of the first pixel based on the identified pixel.

The processor may be further configured to change the pixel value of the first pixel by changing the pixel value of the first pixel into a pixel value of the identified pixel.

According to this, it is possible to enhance the image details without generating or and increasing of the noises. Also, because an exemplary embodiment of the disclosure can be implemented with a simple calculation and logic, it is possible to enhance the image details in a practical and economical way.

The processor may be further configured to: change the pixel value of the first pixel adjacent to the second pixel in which the pixel value difference is more than a predetermined value, and not change the pixel value of the first pixel adjacent to the second pixel in which the pixel value difference is less than the predetermined value. According to this, it is possible to enhance the image details as an area to be processed is reduced.

The processor may be further configured to change the pixel value of the first pixel based on the calculated change degree and the calculated change direction of the pixel value differences between two or more pixel groups each of which includes the second pixels. According to this, it is possible to enhance reliability of the image detail process in view of the overall image.

The processor may be further configured to, in calculating the pixel value differences in each of the pixel groups, vary a weight according to closeness to the first pixel. According to this, more various factors can be considered to identify the change degree and the change direction.

The processor may be further configured to: perform a first change by setting the pixel group to have a first size, and perform a second change by setting the pixel group to have a second size on the image where the first change has been performed. According to this, it is possible to enhance reliability of the image detail process in view of the overall image, while enhancing the image details in precision.

The processor may be further configured to calculate the change degree of the pixel value differences after calculating the change direction of the pixel value differences. Also, the processor may be further configured to calculate the change direction of the pixel value differences based on a result of performing a low pass filtering on the pixel value differences. According to this, it is possible to enhance reliability of the image detail process.

According to an embodiment of the disclosure, the object is achieved by providing a method of controlling a display apparatus, the method including: receiving an image signal; calculating a change degree and a change direction of pixel value differences between at least one first pixel and two or more second pixels of an image, and changing a pixel value of the first pixel based on the pixel value difference which is relatively small among the pixel value differences obtained by the calculated change degree and the calculated change direction; and displaying the changed image.

The changing may include: identifying, based on the calculated change degree and the calculated change direction of the pixel value differences, a pixel which is placed in a direction where the pixel value differences decrease, and changing the pixel value of the first pixel based on the identified pixel.

The changing may include changing the pixel value of the first pixel by changing the pixel value of the first pixel into a pixel value of the identified pixel.

According to this, it is possible to enhance the image details without generating or and increasing of the noises. Also, because an exemplary embodiment of the disclosure can be implemented with a simple calculation and logic, it is possible to enhance the image details in a practical and economical way.

The changing may include: changing the pixel value of the first pixel adjacent to the second pixel in which the pixel value difference is more than a predetermined value, and not changing the pixel value of the first pixel adjacent to the second pixel in which the pixel value difference is less than the predetermined value. According to this, it is possible to enhance the image details as an area to be processed is reduced.

The changing may include changing the pixel value of the first pixel based on the calculated change degree and the calculated change direction of the pixel value differences between two or more pixel groups each of which includes the second pixels. According to this, it is possible to enhance reliability of the image detail process in view of the overall image.

The changing may include, in calculating the pixel value differences in each of the pixel groups, varying a weight according to closeness to the first pixel. According to this, more various factors can be considered to identify the change degree and the change direction.

The changing may include performing a first change by setting the pixel group to have a first size, and performing a second change by setting the pixel group to have a second size on the image where the first change has been performed. According to this, it is possible to enhance reliability of the image detail process in view of the overall image, while enhancing the image details in precision.

The changing may include calculating the change degree of the pixel value differences after calculating the change direction of the pixel value differences. Also, the changing may include calculating the change direction of the pixel value differences based on a result of performing a low pass filtering on the pixel value differences. According to this, it is possible to enhance reliability of the image detail process.

According to an embodiment of the disclosure, the object is achieved by providing a computer-readable medium storing a computer program to execute the method of the display apparatus.

Advantageous Effects

As described above, according to the disclosure, it is possible to enhance the image details without generating and increasing of the noises.

Further, according to the disclosure, it is possible to enhance the image details in a practical and economical way.

DESCRIPTION OF DRAWINGS

FIG. 13 illustrates an another example of a filter according to an another exemplary embodiment;

FIG. 16 illustrates an effect of compensating by the display apparatus according to an exemplary embodiment;

FIG. 20 illustrates a processing sequence by the display apparatus according to an another exemplary embodiment.

BEST MODE

Below, embodiments of the disclosure to actualize the foregoing object in detail will be described in detail with reference to accompanying drawings. However, the configurations and functions illustrated in the following exemplary embodiments are not construed as limiting the present inventive concept and the key configurations and functions. In the following descriptions, details about publicly known functions or features will be omitted if it is determined that they cloud the gist of the present inventive concept.

In the following exemplary embodiments, terms 'first', 'second', etc. are only used to distinguish one element from another, and singular forms are intended to include plural forms unless otherwise mentioned contextually. In the following exemplary embodiments, it will be understood that terms 'comprise', 'include', 'have', etc. do not preclude the presence or addition of one or more other features, numbers, steps, operations, elements, components or combination thereof. In addition, a 'module' or a 'portion' may perform at least one function or operation, be achieved by hardware, software or combination of hardware and software, and be actualized by at least one processor as integrated into at least one module.

Figure 1:
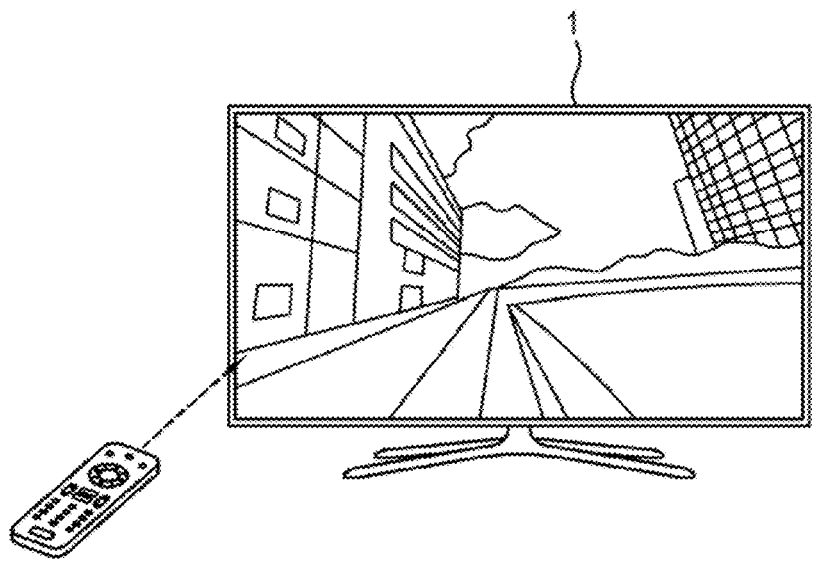
FIG. 1 illustrates an example of according to an embodiment of the disclosure.

FIG. 1 illustrates an example of a display apparatus according to an exemplary embodiment of the disclosure. A display apparatus 1 according to an exemplary embodiment of the disclosure is implemented as, for example, a television (TV). Also, the display apparatus 1 according to an exemplary embodiment of the disclosure is implemented as a device that is able to output an image of a content, for example, a smart phone, a tablet PC, a mobile phone, a wearable device such as a smart watch or a head-mounted display, a computer, a multimedia player, an electronic frame, a digital advertisement board, a large format display (LFD), a digital signage, a set-top box, a refrigerator, etc. However, the display apparatus 1 according to an exemplary embodiment of the disclosure is not limited to those devices but includes any device to output an image of a content.

Figure 2:
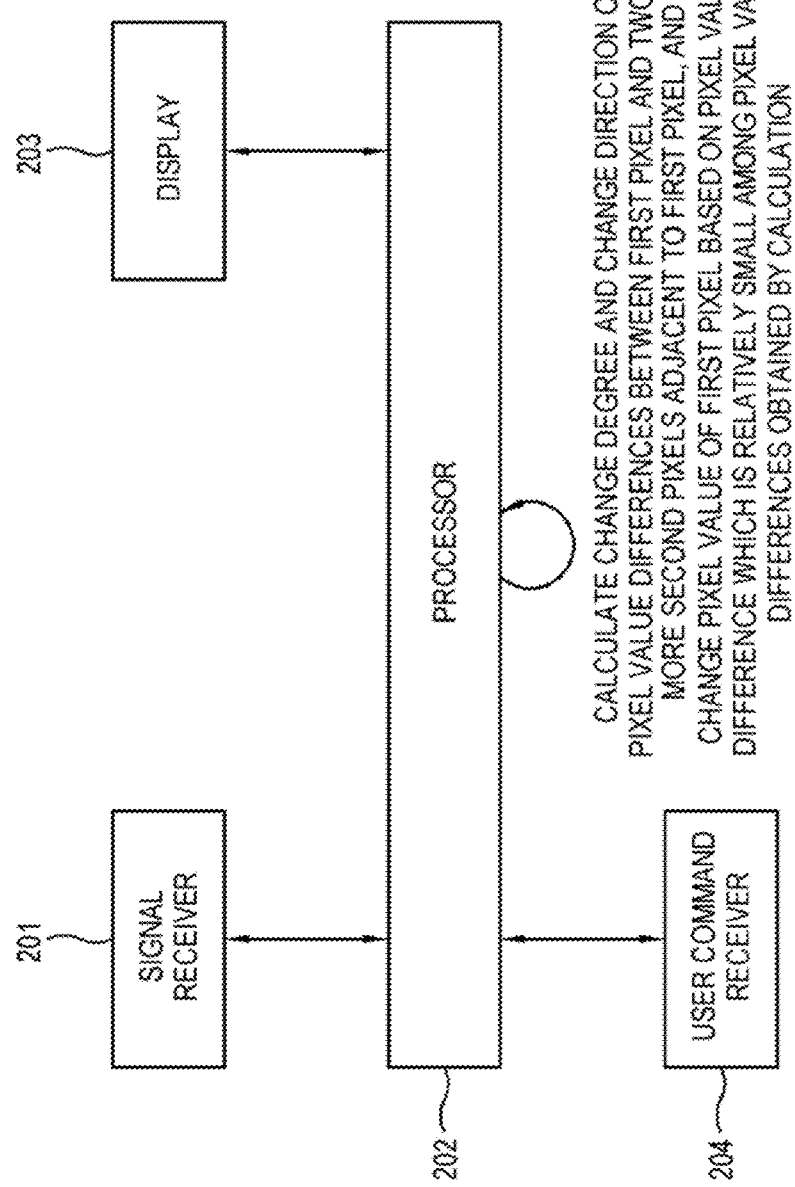
FIG. 2 illustrates a block diagram of a configuration of the display apparatus according to an exemplary embodiment.

FIG. 2 is a block diagram illustrating a configuration of the display apparatus according to an exemplary embodiment of the disclosure. The display apparatus 1 according to an exemplary embodiment of the disclosure includes a signal receiver 201, a processor 202 and a display 203. The display apparatus 1 according to an exemplary embodiment of the disclosure further includes a user command receiver 204. However, the display apparatus 1 according to an exemplary embodiment of the disclosure is not limited to the configuration shown in FIG. 2 but may additionally include another element which is not shown in FIG. 2 or exclude at least one element from the configuration shown in FIG. 2.

The signal receiver 201 receives an image signal. The signal receiver 201 may include a tuner to receive the image signal such as a broadcast signal. The tuner may tune to and receive a broadcast signal of a channel which is selected by a user from among a plurality of channels. Alternatively, the signal receiver 201 may receive the image signal from an external device such as a camera, a server, a universal serial bus (USB) storage device, a digital versatile disc (DVD), a computer, etc.

The signal receiver 201 may include a communication device to communicate with an external device to receive the image signal. The communication device is implemented in various ways according to the external device. For example, the communication device includes a connector which is able to send or receive a signal or data according to a standard such as High Definition Multimedia Interface (HDMI), Consumer Electronics Control (HDMI-CFC), USB, Component, etc., and includes at least one terminal which corresponds to the standard. The communication device is able to communicate with servers via a local area network (LAN).

The communication device may be implemented in various ways of communication other than the connector including the terminal for a wired connection. For example, the communication device may include a radio frequency circuit to send or receive a radio frequency signal to wirelessly communicate with an external device based on at least one of Wi-Fi, Bluetooth, Zigbee, Ultra-Wide Band (UWB), Wireless USB, Near Field Communication (NFC), etc.

The processor 202 performs an image process on an image signal which is received through the signal receiver 201 and outputs the image signal on which the image process has been performed to the display 203, thereby displaying an output image on the display 203.

The processor 202 is able to further perform at least one image process such as scaling which adjusts a resolution of an image other than the above-mentioned process. The processor 202 may be implemented as hardware, software or a combination of hardware and software which performs the above-mentioned process.

The display 203 displays an output image 206 which is obtained using an image process performed by the processor 202. The type of the display 203 is not limited but is implemented in various display types such as a liquid crystal, a plasma, a light emitting diode, an organic light-emitting diode (OLED), a surface-conduction electron-emitter, a carbon nano-tube, nano-crystal, etc.

The display 203 of the liquid crystal type may include a liquid crystal display panel, a backlight unit for providing light to the liquid crystal display panel, a panel driver for driving the liquid crystal display panel, etc. The display 203 without the backlight unit may include an OLED panel which is a self-emitting light device.

The user command receiver 204 receives a user command and sends the received user command to the processor 202. The user command receiver 204 is implemented in various ways according to user input methods such as a menu button which is installed on an outer side of the display apparatus 1, a remote control signal receiver which receives a remote control signal of the user command from a remote controller, a touch screen which is provided on the display and receives a user touch input, a camera which detects a user gesture input, a microphone which recognizes a user voice input, etc. The user command receiver 204 is able to receive a user input to instruct to perform an image process.

The processor 202 is able to perform a control operation to allow overall configurations of the display apparatus 1 to operate. The processor 202 may include a control program (or an instruction) which allows the control operation to be performed, a non-volatile memory in which the control program is installed, a volatile memory in which the installed control program is loaded and perform the loaded control program. The processor 202 may be implemented as a central processing unit. The control program may be stored in another electronic device other than the display apparatus 1.

The control program may include a basic input/output system (BIOS), a device driver, an operating system, a firmware, a platform, an application program, etc. In an exemplary embodiment of the disclosure, the application program may be in advance installed and stored in the display apparatus 1 in a stage of manufacturing or be installed in the display apparatus 1 by receiving data of the application program from an external device when the display apparatus 1 is used by a user. The data of the application program may be downloaded from, for example, an external server such as an application market but is not limited. Meanwhile, the processor 202 may be implemented in a way of a device, a software module, a circuit, a chip, etc.

The processor 202 controls the signal receiver 201 to receive an image signal. The processor 202 performs an image process on the received image signal and controls the display 203 to display an output image. Although the display apparatus 1 illustrated in FIG. 2 is implemented as a single processor 202 performs the image process and the control operation, it is merely an exemplary embodiment of the disclosure and the display apparatus 1 may be implemented to further include an additional processor or a controller other than the processor 202.

Figure 3:
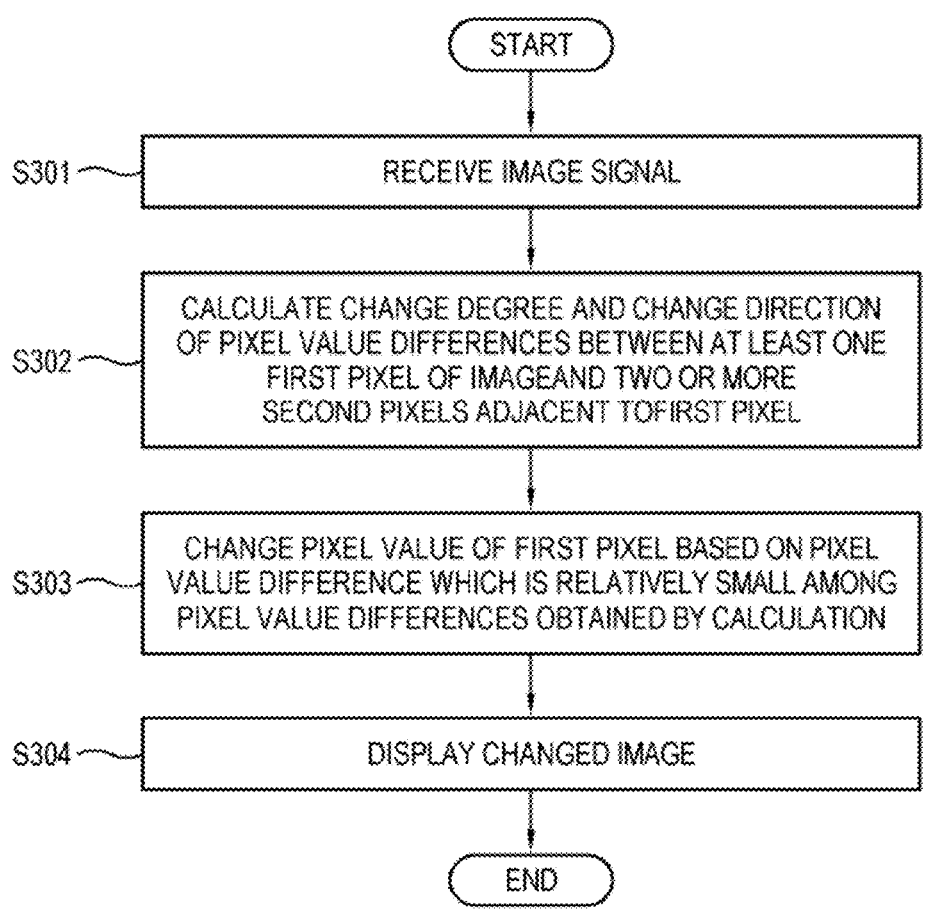
FIG. 3 illustrates a control method of the display apparatus according to an exemplary embodiment.
Figure 4:
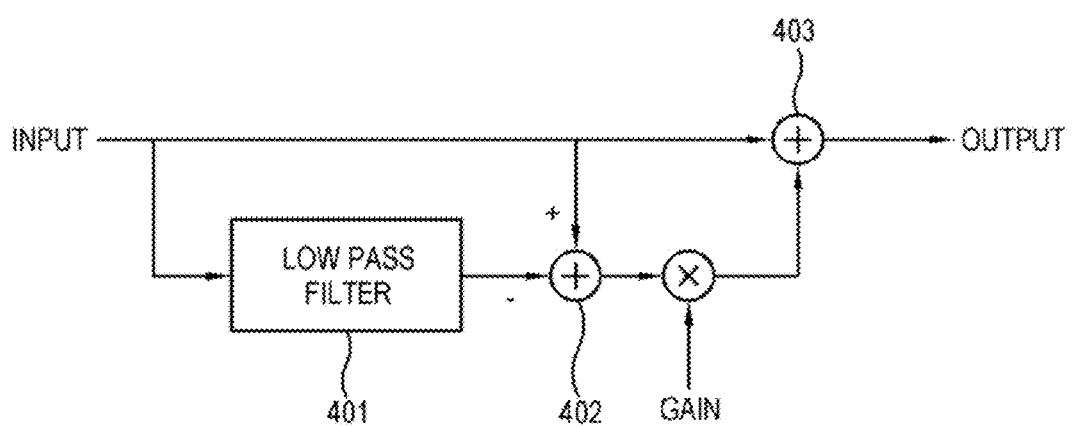
FIG. 4 illustrates an overview of an operation according to a background art.
Figure 5:
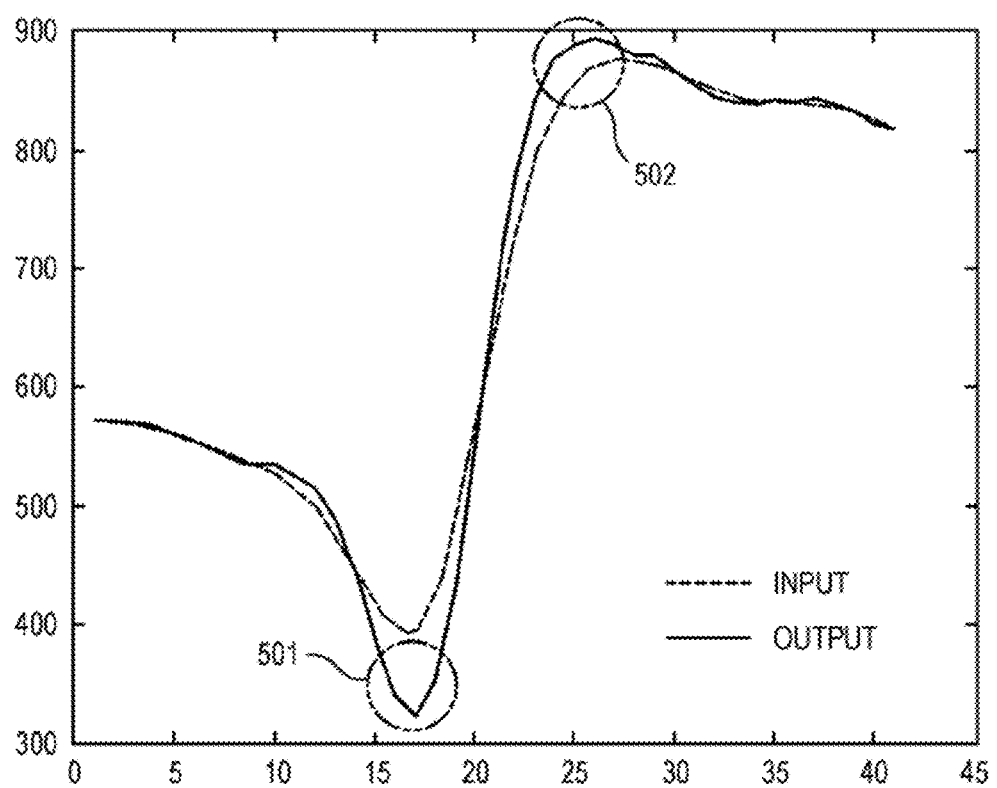
FIG. 5 illustrates input and output signals according to a background art.

Hereinafter, the processor 202 according to an exemplary embodiment of the disclosure is described in detail. FIG. 3 is a flowchart illustrating a control method of the display apparatus according to an exemplary embodiment of the disclosure.

The processor 202 of the display apparatus according to an exemplary embodiment of the disclosure controls the signal receiver 201 to receive an image signal (S301). Then, the processor 202 calculates a change degree and a change direction of pixel value differences between at least one first pixel and two or more second pixels of an image(S302).

Here, the pixel value refers to a value which is set for each pixel of the image and has, for example, a value of 0 or 1 when the image is a black and white image or a value between 0 to 255 in a grey image. In another example, when the image is a color image, the pixel value has a value which corresponds to a color system, to which the color image is pertained, such as RGB, CMY, YCbCr, YIQ, HIS, etc., where the value corresponds to one of red, green and blue in case of RGB.

The change degree of the pixel value differences refers to a value which indicates a degree of increase or decrease of the pixel value differences which become increased or decreased. For example, supposing that the two or more second pixels which are adjacent to the first pixel are called as a 2-1 pixel and a 2-2 pixel, respectively, and the first pixel has a value of 20, while the 2-1 pixel and the 2-2 pixel having values of 10 and 50, respectively, the pixel value difference between the 2-1 pixel and the first pixel is 10 whereas the pixel value difference between the first pixel and the 2-2 pixel is 40, wherein the pixel value differences increase from 10 to 40, thereby the change degree of the pixel value differences being 30.

The change direction of the pixel value differences refers to a direction of increase or decrease of the pixel value differences which become increased or decreased. For example, supposing that a left direction corresponds as the pixel value differences increase, a right direction corresponding as the pixel value differences decrease, the pixel value differences increase while moving over the 2-1 pixel→ the first pixel→ the 2-2 pixel, thereby the change direction of the pixel value differences being the left direction. However, it is merely an exemplary embodiment of disclosure and is possible that other change directions correspond as the pixel value differences increase or decrease.

Then, the processor 202 changes the pixel value of the first pixel based on the pixel value difference which is relatively small among the pixel value differences obtained by obtained by the calculation (S303).

Here, the changing of the pixel value refers to a process of changing the pixel value consequently. For example, the changing of the pixel value may be applying an arithmetical operation on the pixel value such as adding, subtracting, multiplexing, etc. a value with regard to the pixel value or be replacing the pixel value with another pixel value.

Here, the pixel value difference which is relatively small among the pixel value differences refers to a process based on the pixel value difference which is relatively small. The pixel value difference which is relatively small may be directly or indirectly used. An example of indirectly using the pixel value difference which is relatively small includes identifying a pixel (hereinafter, referred to as 'reference pixel') which is placed in a direction where the pixel value differences decrease with regard to the first pixel, that is, a direction from a portion where the pixel value difference is relatively large towards a portion where the pixel value difference is relatively small and changing the pixel value of the first pixel based on the identified reference pixel, but is not limited. The changing of the pixel value of the first pixel based on the identified reference pixel may be increasing or decreasing the pixel value of the first pixel to approximate the pixel value of the reference pixel or replacing the pixel value of the first pixel with the pixel value of the reference pixel, but is not limited.

Then, the processor 202 controls the display 203 to display the changed image (S304).

Figure 6:
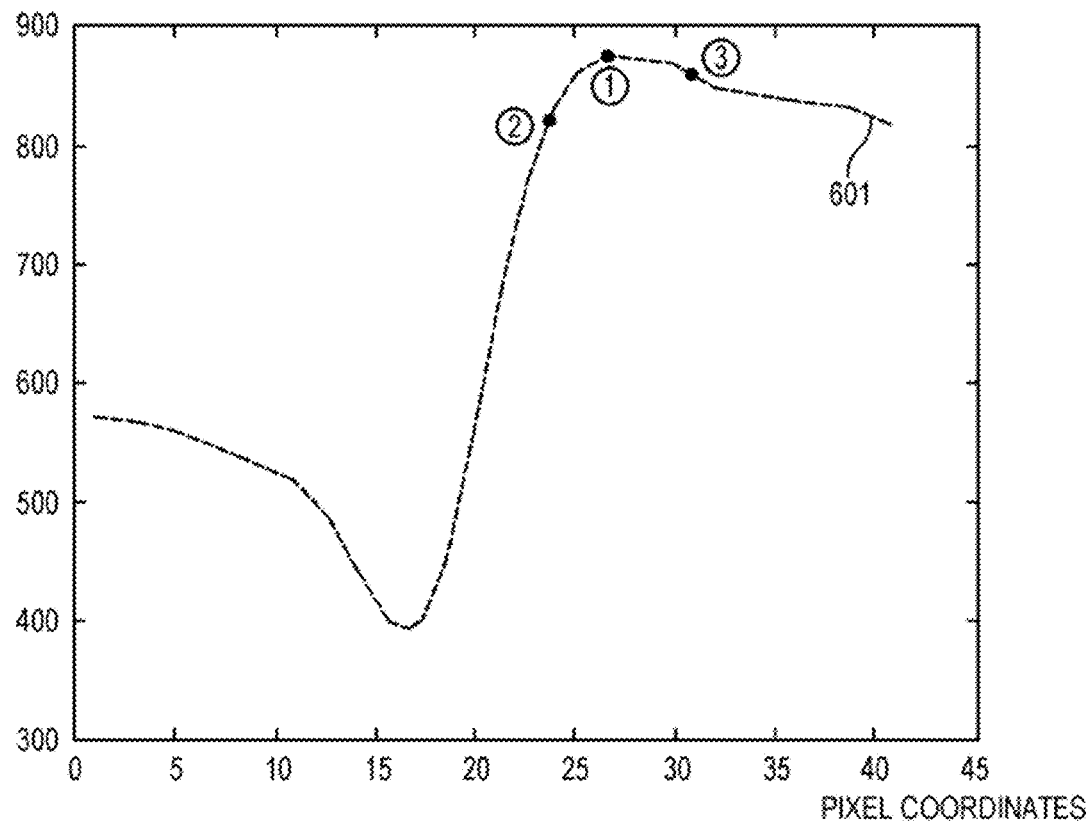
FIG. 6 illustrates a processing sequence by the display apparatus according to an exemplary embodiment.

Hereinafter, a process performed by the display apparatus according to an exemplary embodiment of the disclosure is described in detail referring to FIG. 6. FIG. 6 illustrates an operation performed by the processor 202 of the display apparatus according to an exemplary embodiment of the disclosure, where the operation is to calculate the change degree and the change direction of the pixel value differences between the first pixel ① and the two or more second pixels ② and ③ which are adjacent to the first pixel. In favor of description, the pixels of the input signal are supposed to be placed in a first dimensional coordinate, but coordinates according to an exemplary embodiment of the disclosure are not limited to the first dimensional coordinate and may be two or more dimensional coordinates.

A graph 610 illustrates an example of the input signal and indicates a relationship between pixel coordinates and pixel values of the pixels of the input signal which are placed in the first dimensional coordinate. The coordinates of the first pixel ① and the second pixels ② and ③ on the graph 610 are 28, 24 and 32, respectively, and the pixel values of the pixels are 880, 840 and 860, respectively, where the processor 202 of the display apparatus is able to identify that the pixel value difference between the first pixel ① and the second pixel ② and the pixel value difference between the first pixel ① and the second pixel ③ are 40 and 20, respectively. based on this, the processor 202 is able to calculate the change degree of the pixel value differences which is 20 (=|20−40|) in a route of the second pixel ② towards the second pixel ③ via the first pixel ①.

Meanwhile, supposing that the change direction is a direction where the pixel value differences decrease (alternatively, the change direction may be supposed to be an opposite direction where the pixel value differences increase), the processor 202 of the display apparatus is able to identify that the pixel value difference between the first pixel ① and the second pixel ③ is smaller than the pixel value difference between the second pixel ② and the first pixel ① and that the pixel value differences decrease in the route of the second pixel ② towards the second pixel ③ via the first pixel ①. Therefore, the processor 202 of the display apparatus is able to calculate the change direction (a right direction) of the pixel value differences at the first pixel ① being a direction towards the second pixel ③ (a direction where the pixel value differences decrease).

Figure 7:
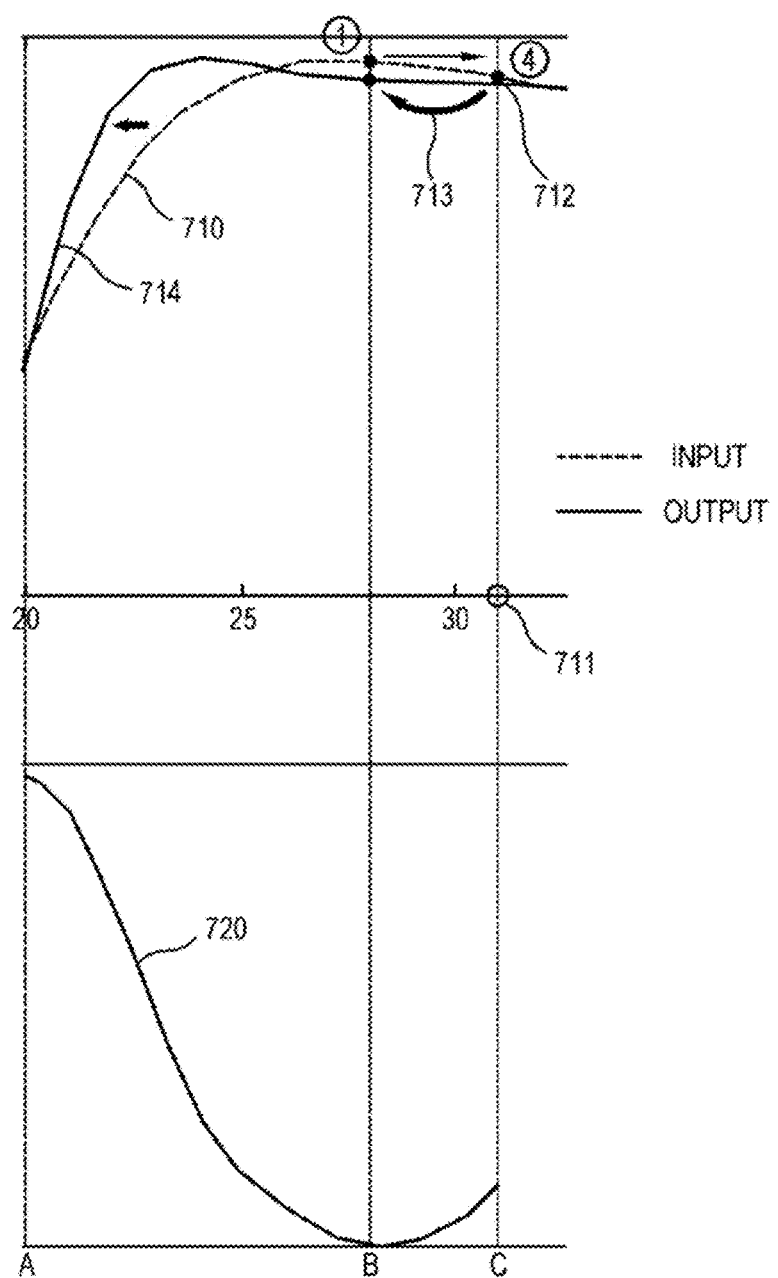
FIG. 7 illustrates a processing result by the display apparatus according to an exemplary embodiment.

Hereinafter, a process to change the pixel value of the first pixel ① based on the change degree and the change direction of the pixel value differences which are calculated by the above-mentioned process is described in detail referring to FIG. 7. FIG. 7 illustrates a process to change the pixel value of the first pixel, where the pixel value of the first pixel is changed with a value of the reference pixel. However, the process to change the pixel value of the first pixel is not limited to that the pixel value of the first pixel is changed with a value of the reference pixel.

A graph 710 illustrates a part (intervals A~B~C in the coordinates) of the graph 610 of the input signal shown in FIG. 6, while a graph 720 is a first order derivative of the graph 710. Because the change degree and the change direction of the pixel value differences are previously calculated as 20 and a right direction, respectively, the processor 202 of the display apparatus identifies based on the calculation a reference pixel ④ which is away from the first pixel ① by a distance corresponding to the change degree of 20 in the right direction and change the pixel value of the first pixel ① into a pixel value 712 of the reference pixel ④. Therefore, it provides an effect 713 that a position of the reference pixel ④ visually appears to move to that of the first pixel ①.

When the changing process is applied to all pixels throughout the coordinates A to B, the input signal 710 is changed into an output signal 714 by the changing process. Because it is understood from the graph 720 that the value of the first order derivative for each pixel of the coordinates A through B is gradually reduced, which means that the pixel value difference for each pixel of the coordinates A through B is also reduced, the processor 202 of the display apparatus calculates all the change direction of the pixel value differences for each pixel as a right direction. The processor 202 of the display apparatus is able to change, based on the calculated change degree and the calculated change direction, the pixel value of each pixel of the coordinates A through B into the pixel value of the reference pixel which is away from the pixel by the change degree corresponding to the pixel in the right direction, where the output signal becomes in a form of the graph 714, thereby providing a visual effect as if the reference pixel moves to the left. Comparing the output signal 714 with the input signal 710, the output signal 714 is changed more rapidly than the input signal 710 in a same interval A to B, thereby providing an effect that the image details are visually enhanced.

Here, because the value of the first order derivative for the pixel of the input signal being large means that a change amount of the pixel value for the pixel is large, this means that the image is a high frequency area. In contrast, the value of the first order derivative for the pixel of the input signal being small means that the image is a low frequency area. Therefore, a fact that the input signal 710 is changed into the output signal 714 by the processor 202 of the display apparatus according to an exemplary embodiment of the disclosure means that the pixels of the input signal generally move in a direction from the low frequency area towards the high frequency area. Accordingly, there occurs an effect as if an input image is generally pressed in the direction from the low frequency area towards the high frequency area, and in a result of that, there arises an effect that the image details are visually enhanced because a signal change in the high frequency area becomes more rapid. Meanwhile, because the effect of the image detail enhancement according to an exemplary embodiment of the disclosure occurs due to a pixel movement in the input image, an overshoot which is supposed to happen in a conventional method when the unsharp filtering that amplifies a high frequency signal of an image is used does not occur in an exemplary embodiment of the disclosure. Therefore, according to an exemplary embodiment of the disclosure, it is possible to enhance the image details without generating or and increasing of the noises. Also, because an exemplary embodiment of the disclosure can be implemented with a simple calculation and logic, it is possible to enhance the image details in a practical and economical way.

The processor 202 of the display apparatus according to an exemplary embodiment of the disclosure may change the pixel of which the pixel value difference to an adjacent pixel is more than a predetermined value and may not change the pixel of which the pixel value difference to an adjacent pixel is less than the predetermined value. That is, all the pixels of the input image are not changed, but only the pixel of which the pixel value difference to an adjacent pixel is more than the predetermined value in the high frequency area may be changed. According to this, it is possible to enhance a process efficiency due to an area to be processed being reduced.

Figure 8:
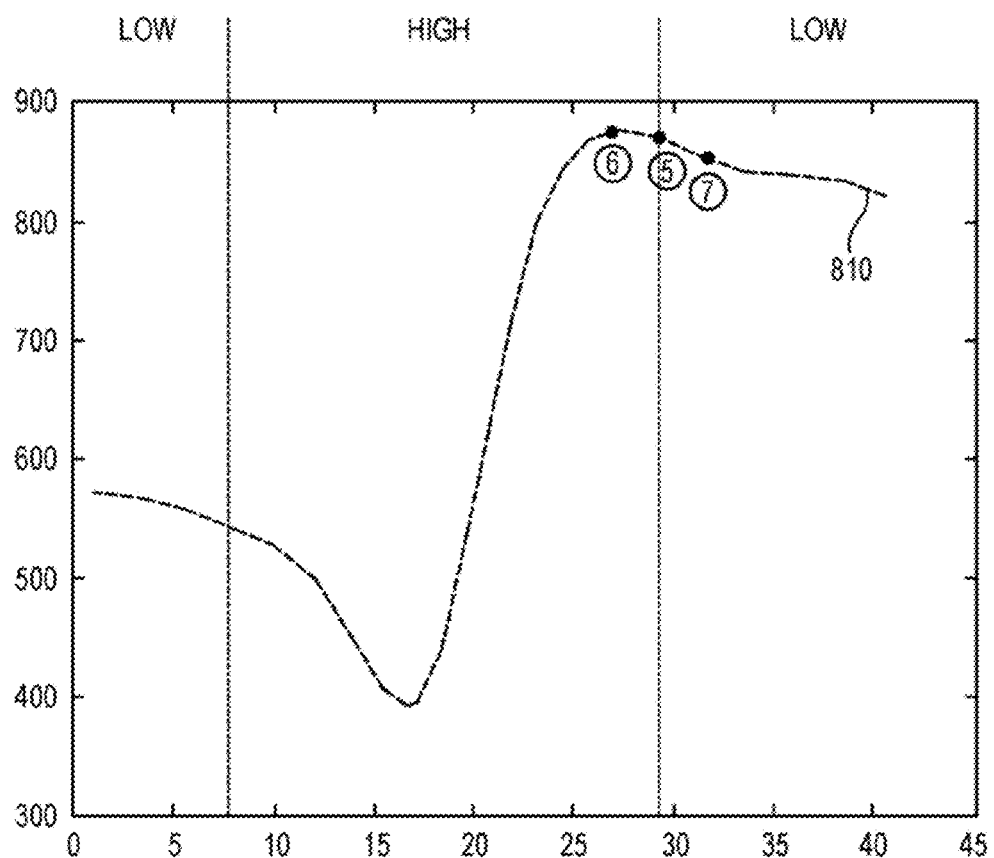
FIG. 8 illustrates an another example of a processing sequence by the display apparatus according to an exemplary embodiment.

Although an exemplary embodiment of the disclosure to change the pixel value of the at least one first pixel of the image based on the change degree and the change direction of the pixel value difference between the first pixel and the two or more second pixels adjacent to the first pixel has been described, a result that is not expected might be caused because a local change of the image signal is excessively identified. This will be described referring to FIG. 8. FIG. 8 illustrates another process performed by the display apparatus according to an exemplary embodiment of the disclosure.

FIG. 8 illustrates an operation performed by the processor 202 of the display apparatus according to an exemplary embodiment of the disclosure, where the operation is to calculate the change degree and the change direction of the pixel value differences between the first pixel ⑤ and the two or more second pixels ⑥ and ⑦ which are adjacent to the first pixel. The coordinates of the first pixel ⑤ and the second pixels ⑥ and ⑦ on the graph 810 of the input signal are 31, 30 and 32, respectively, and the pixel values of the pixels are 870, 875 and 860, respectively, where the processor 202 of the display apparatus is able to identify that the pixel value difference between the first pixel ⑤ and the second pixel ⑥ and the pixel value difference between the first pixel ⑥ and the second pixel ⑦ are 5 and 10, respectively. based on this, the processor 202 is able to calculate the change degree of the pixel value differences which is 5(=|5−10|) in a route of the second pixel ⑤ towards the second pixel ⑦ via the first pixel ⑤.

Meanwhile, supposing that the change direction is a direction where the pixel value differences decrease (alternatively, the change direction may be supposed to be an opposite direction where the pixel value differences increase), the processor 202 of the display apparatus is able to identify that the pixel value difference between the first pixel ⑤ and the second pixel ⑦ is larger than the pixel value difference between the first pixel ⑤ and the second pixel ⑥ and that the pixel value differences increase in the route of the second pixel ⑥ towards the second pixel ⑦ via the first pixel ⑤. Therefore, the processor 202 of the display apparatus is able to calculate the change direction (a left direction) of the pixel value differences at the first pixel ⑤ being a direction towards the second pixel ⑥ (a direction where the pixel value differences decrease).

However, it may not be appropriate to an object of enhancing the image details that the change direction of the pixel value differences at the first pixel ⑤ is calculated as the left direction. Supposing in the first order derivative of the input signal 810 that the input signal is divided into the high frequency area HIGH and the low frequency area LOW, the pixel ⑥ is placed on the left from the pixel ⑤ and is placed in a direction towards the high frequency area, while the pixel ⑦ is placed on the right from the pixel ⑤ and is placed in a direction towards the low frequency area, thereby the pixel ⑤ being needed to move in a direction from the low frequency area to the high frequency area, that is, to move from the right to the left so as to enhance the image details. If the change direction of the pixel value differences for the pixel ⑤ the would be 'a right direction', there might occur an effect that the pixel moves from the right to the left by referring to the pixel value of a pixel which is placed in the direction. However, because the direction that is calculated as the change direction of the pixel value differences for the pixel ⑤ illustrated in FIG. 8 is 'a left direction' which is opposite, there might be a problem that a result opposite to an expected result happens.

Figure 9:
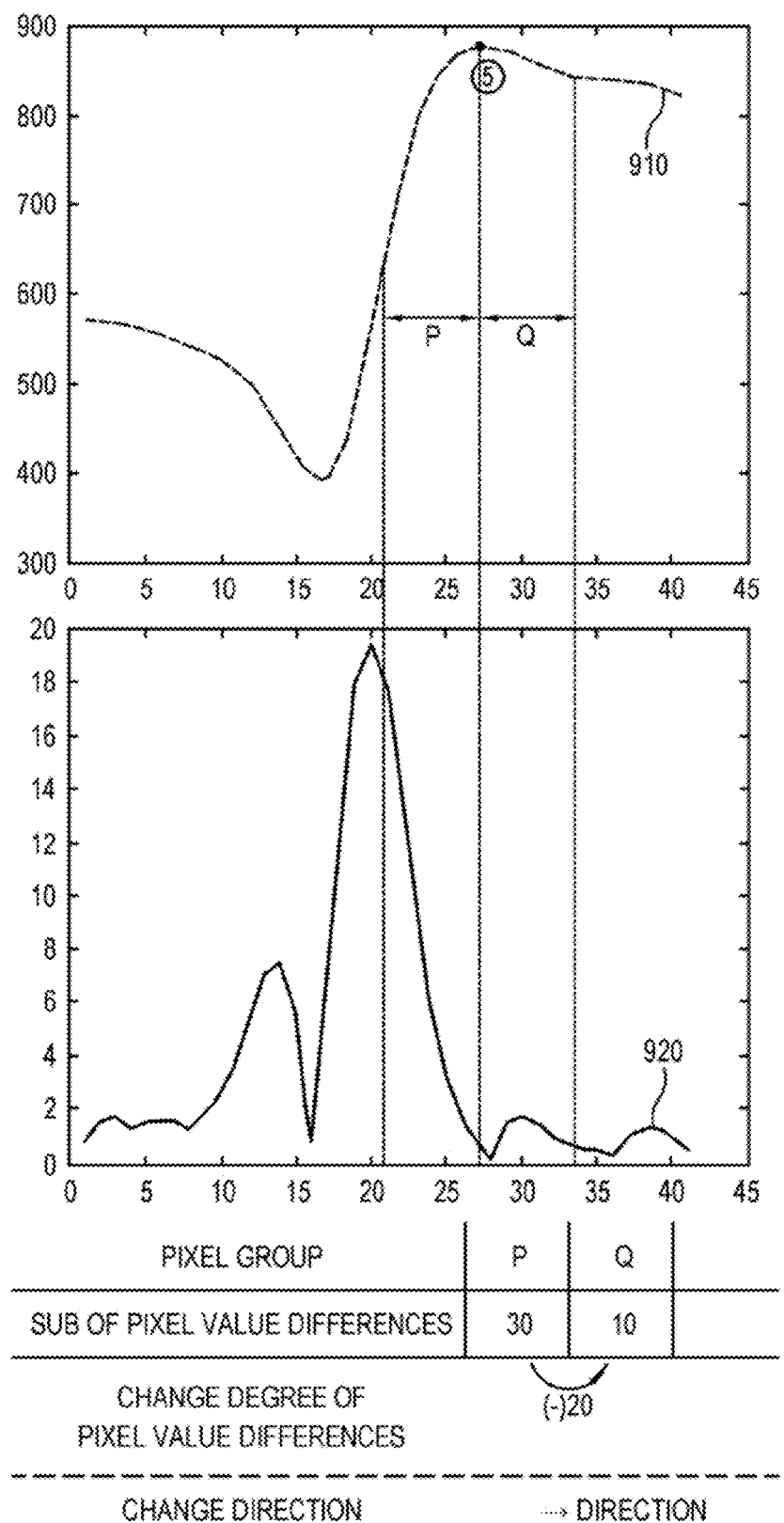
FIG. 9 illustrates a processing sequence by the display apparatus according to an another exemplary embodiment.

An exemplary embodiment of the disclosure for solving the problem will be described referring to FIG. 9. FIG. 9 illustrates another process performed by the processor 202 of the display apparatus according to an exemplary embodiment of the disclosure.

In an exemplary embodiment of the disclosure illustrated in FIG. 9, the change degree and the change direction of the pixel value differences between the first pixel and the two or more second pixels which are adjacent to the first pixel are not calculated as above, the pixel value of the first pixel is changed based on the change degree and the change direction of the pixel value differences between the first pixel and two or more second pixel 'groups'. That is, the change degree and the change direction of the pixel value differences between the first pixel ⑤ and the two or more second pixels ⑥ and ⑦ which are adjacent to the first pixel are not calculated, but the change degree and the change direction of the pixel value differences between a pixel group P which includes pixels from the pixel ⑤ to the pixel ⑥ and a pixel group Q which includes pixels from the pixel ⑤ to the pixel ⑦ are calculated for the pixel ⑤, where the pixel value of the first pixel is changed based on the calculation.

In order to calculate the change degree and the change direction of the pixel value differences between the two pixel groups, it is necessary to calculate a sum of the pixel value differences for each pixel group. For example, in order to obtain the change degree and the change direction of the pixel value differences between the pixel group P and the pixel group Q, it is necessary to compare a sum of the pixel value differences for the pixel group P and a sum of the pixel value differences for the pixel group Q. The sum of the pixel value differences for the pixel group P, that is, the sum of the pixel value differences for the pixels in the pixel group P can be calculated by, for example, an integral of an interval of the pixel group P in the first order derivative of the input signal 910, but is not limited. The sum of the pixel value differences for the pixel group Q can be calculated in a same way.

As illustrated in FIG. 9, supposing that the sums of the pixel value differences for the pixel groups P and Q are calculated as 30 and 10, respectively, the processor 202 of the display apparatus according to an exemplary embodiment of the disclosure is able to calculate the change degree of the pixel value differences between the pixel group P and the pixel group Q as 20(=|10−30|). Also, the change direction of the pixel value differences for the pixel ⑤ between the pixel groups can be calculated as a direction (a right direction) from the pixel ⑤ towards the pixel group Q because the pixel value differences decrease from the pixel ⑤ towards the pixel group Q. As a result, because the pixel value can be changed referring to a reference pixel which is on the right from the pixel ⑤, unlike in FIG. 8, a result that the pixel moves from the right to the left, that is, moves in a direction from the low frequency area towards the high frequency area can be obtained.

In other words, if the pixel value of the first pixel is changed based on the change degree and the change direction of the pixel value differences between the pixel groups adjacent to the at least one first pixel of the image as described above, the pixel value of the first pixel can be changed based on that the low frequency area and the high frequency area are divided in view of the overall image, where it is regardless of areas which are identified as a locally or relatively low frequency area in a high frequency area. Therefore, according to this, it is possible to enhance reliability of the image detail process in view of the overall image.

Figure 10:
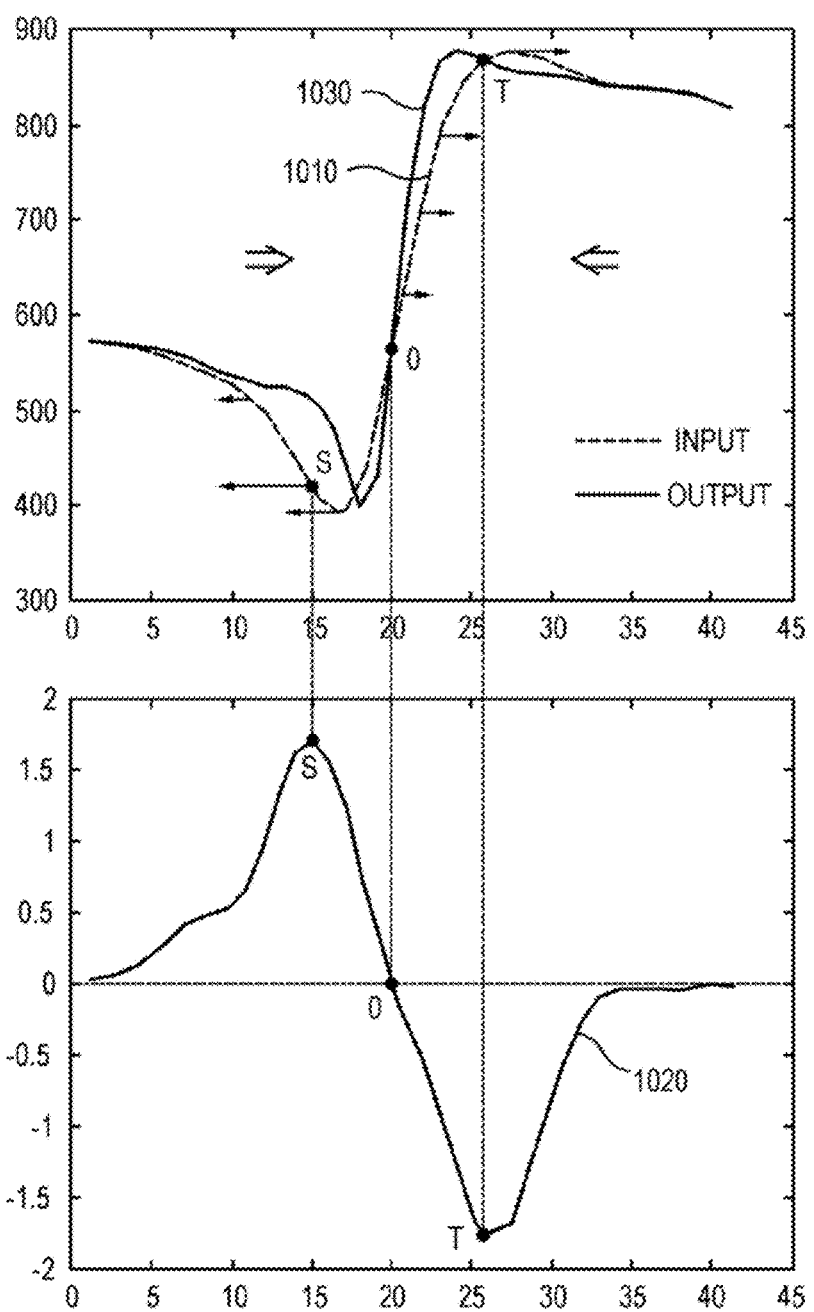
FIG. 10 illustrates a processing sequence by the display apparatus according to an another exemplary embodiment.

Hereinafter, referring to FIG. 10, a result that is applied with another exemplary embodiment of the disclosure will be described.

Supposing that each pixel of the input signal 1010 is applied with another exemplary embodiment of the disclosure as described above, the processor 202 calculates the change degree and the change direction of (a sum of) the pixel value difference between the pixel groups which are adjacent to the pixel. Because the calculated change degree and the calculated change direction can be represented as a vector, the processor 202 is able to make the change degree and the change direction for each pixel correspond to a vector which has a magnitude and a direction, respectively. Further, a vector corresponding to each pixel can be represented as a single graph like a graph 1020. In the graph 1020, a value of the graph for each pixel indicates a magnitude of a vector corresponding to the pixel, that is, the change degree, while a sign (+ or −) of the graph indicates a direction of a vector corresponding to the pixel, that is, the change direction.

Referring to the graph 1020 indicating the vector, a process to change the pixel value of each pixel can be illustrated. For example, a magnitude of a vector for a point O on the graph 1020 is 0. Therefore, because a reference pixel that is referred to for changing the pixel corresponding to the point O is the reference pixel itself, the pixel value for the point O is not changed. In contrast, considering to a point S on the graph 1020, because the magnitude of the vector is 1.7, while the direction of the vector being a left direction (because the sign is +, the pixel value differences increase as the pixel coordinate increases, the direction of the vector which indicates a direction where the pixel value differences decrease being a left direction which is a direction where the pixel coordinate decreases), the reference pixel that is referred to for changing the pixel corresponding to the point S is a pixel which is away from the pixel to be changed to the left by a distance proportional to 1.7 that is the magnitude of the vector and the change degree. According to the graph 1020, because the sign of points like the point S on the graph to the left from the point O is all +, the processor 202 changes the pixel value of the pixels on the left from the point S referring to a value of the reference pixel which is placed on the left from the pixel. That, because the image that is placed on the left from the point O moves towards the point O, there occurs a visual effect that the image is pressed to the right. In contrast, because the image that is placed on the right from the point O moves towards the point O, there occurs a visual effect that the image is pressed to the left.

A graph 1030 illustrates an example of the output signal which is generated as a result of the above process. Because the change is performed such that the change of the output signal is more rapid in the high frequency area than that of the input signal, there occurs an effect that the image details are visually enhanced. Also, it is understood that an overshoot does not occur in the output signal.

Figure 11:
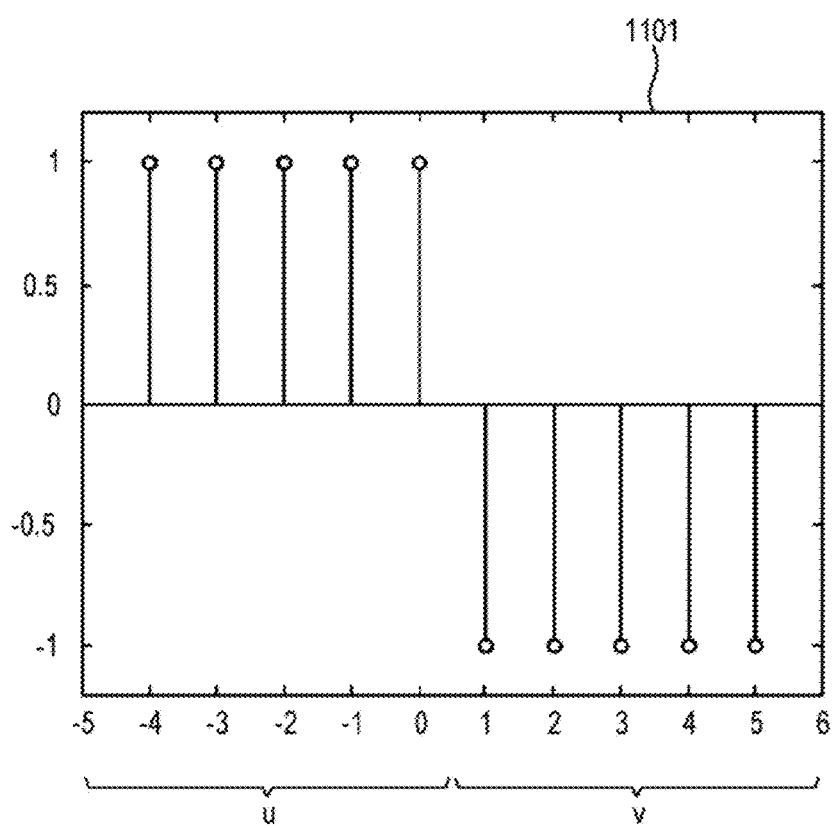
FIG. 11 illustrates an example of a filter according to an another exemplary embodiment.
Figure 12:
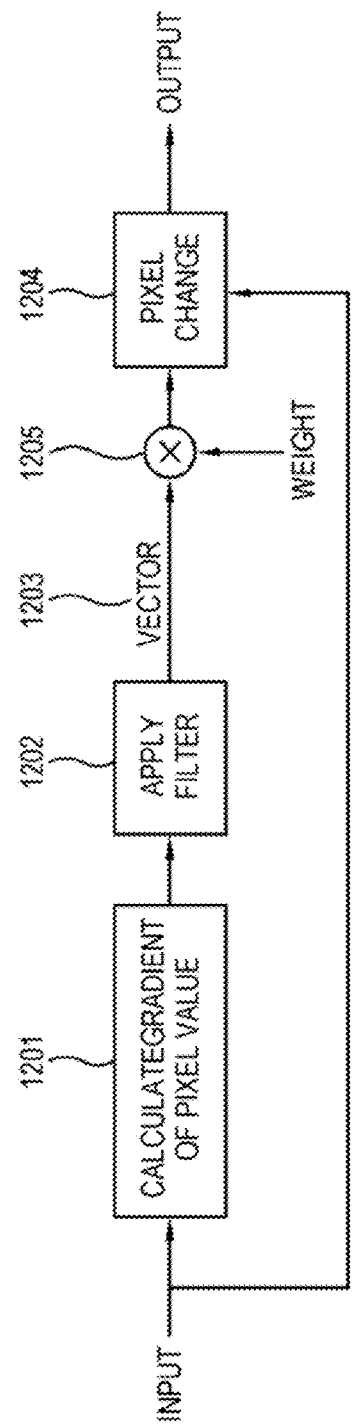
FIG. 12 illustrates a flow of a processing sequence by the display apparatus according to an another exemplary embodiment.

As another example of a process to the change degree and the change direction of a sum of the pixel value differences between two pixel groups which are adjacent to the first pixel, there can be a process to calculate the pixel value differences for each pixel in a signal area including the first pixel and apply a filter on the calculated result. This will be described in detail referring to FIGS. 11 and 12. FIG. 11 illustrates a filter of an exemplary embodiment of the disclosure, while FIG. 12 illustrates a process flow of the display apparatus according to an exemplary embodiment of the disclosure.

First, the processor 202 according to an exemplary embodiment of the disclosure is able to identify a value which indicates the pixel value differences for each pixel in a signal area including the first pixel. As a way of identifying the value which indicates the pixel value differences for each pixel, for example, a gradient of the pixel value for each pixel can be calculated based on a derivative (1201). Then, the processor 202 can apply a filter 1101 as illustrated in FIG. 11 on a signal area including the first pixel, for example, a signal area which is placed within 5 pixels from the first pixel on both sides (1201). Because the application of the filter 1101 means that a sum of the pixel value differences of the pixel group V which is placed within 5 pixels on the right from the first pixel is subtracted from a sum of the pixel value differences of the pixel group U which is placed within 5 pixels on the left from the first pixel, a result vector 1203 corresponding to the change degree and the change direction of the pixel value differences between the two pixel groups can be obtained. Then, the processor 202 can change the pixel value of each pixel into a pixel value of the reference pixel to which the vector corresponding to the pixel directs. In the process, a strength of an effect can be adjusted by multiplexing a weight to the vector (1205).

The filter is not limited to the filter illustrated in FIG. 11. Any filter to be able to obtain a result which corresponds to the change degree and the change direction of the pixel value differences between the two pixel groups is possible. An example of applying another filter will be described referring to FIG. 13.

If the processor 202 applies a filter 1301, a same result in the change degree of the pixel value differences between the two pixel groups is obtained as the filter 1101, but a result in the change direction is opposite. In the case, contrary to a previous example having an effect that the pixels move in a direction from the low frequency area towards the high frequency area, thereby enhancing the image details, there may occur an effect that the image becomes blur by moving the pixels in a direction from the high frequency area towards the low frequency area. That is, according to this, the disclosure can also be applied to an embodiment to have an effect of making the image blur.

If the processor 202 applies a filter 1302, the more the pixel is close to the first pixel which is placed at a center, the larger weight is considered to calculate the change degree of the pixel value differences. That is, in calculating the pixel value differences in the pixel group using the filter 1302, the processor 202 can vary a weight according to closeness to the first pixel. A filter 1303 is an example to be used in calculating the pixel value differences where a weight varies according to closeness to the first pixel, and the more the pixel is placed at a center of the pixel group, the larger weight is considered. According to this, more various factors can be considered to identify the change degree and the change direction.

Although an example where the pixels of the input signal are placed on a first order coordinate has been described, the coordinate on which the pixels are placed is not limited to the first order coordinate. An embodiment of the disclosure can be applied to where the pixels are placed on a second order coordinate.

An embodiment of the disclosure where the pixels are placed on a second order coordinate will be described referring to FIGS. 14 to 17.

Figure 14:
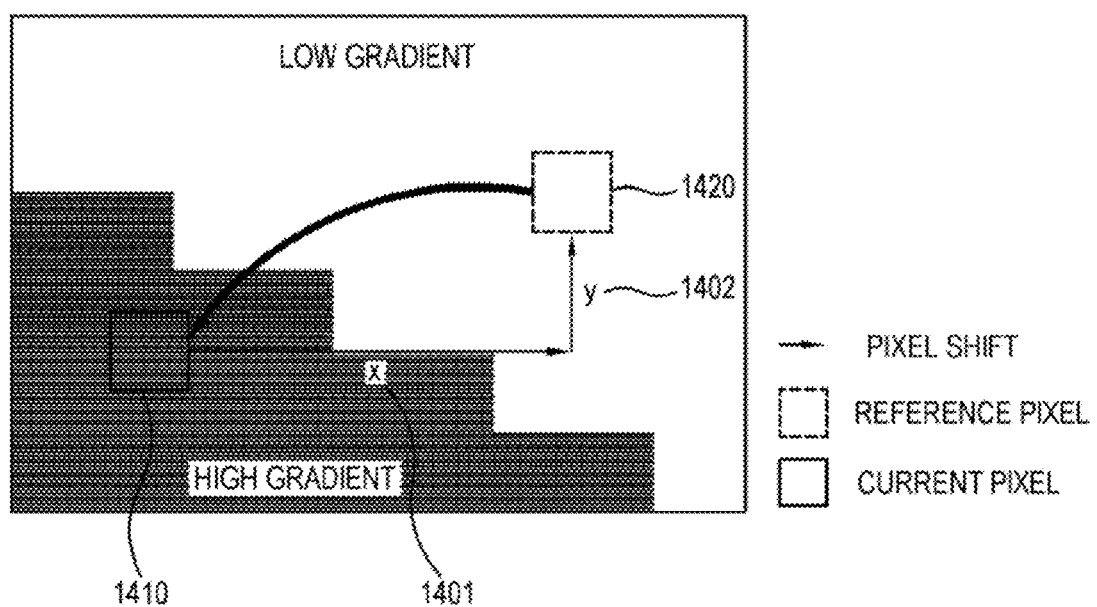
FIG. 14 illustrates a concept of compensating pixel values in the display apparatus according to an exemplary embodiment.

FIG. 14 illustrates an example of changing the pixel values where the pixels are placed on a second order coordinate. For the pixels placed on the second order coordinate, the processor 202 of the display apparatus may apply one of the embodiments which have been described above on an X axis and the one or another of the embodiments on a Y axis. The processor 202 may perform the embodiments on two axes in parallel or serially, that is, perform on one axis and then on another axis. Regardless of any ways, the processor 202 may identify a reference pixel based on a sum of vectors which are generated by applying the embodiment on each axis. For example, in changing pixels 1410, the processor 202 may first identify a vector 1401 which directs to a reference pixel in the X axis by applying an embodiment and then identify a vector 1402 which directs to a reference pixel in the Y axis by applying an embodiment. And then, the processor 202 may identify a vector which directs to reference pixels 1420 for the pixels 1410, the vector corresponding to a sum of the two vectors 1401 and 1402. Accordingly, the processor 202 can change the pixel values of the pixels 1410 by referring to the reference pixels 1420. If a way of changing the pixel values of current pixels into the pixel values of the reference pixels is used, there occurs an effect that the reference pixels 1420 move to the positions of the pixels 1410.

Figure 15:
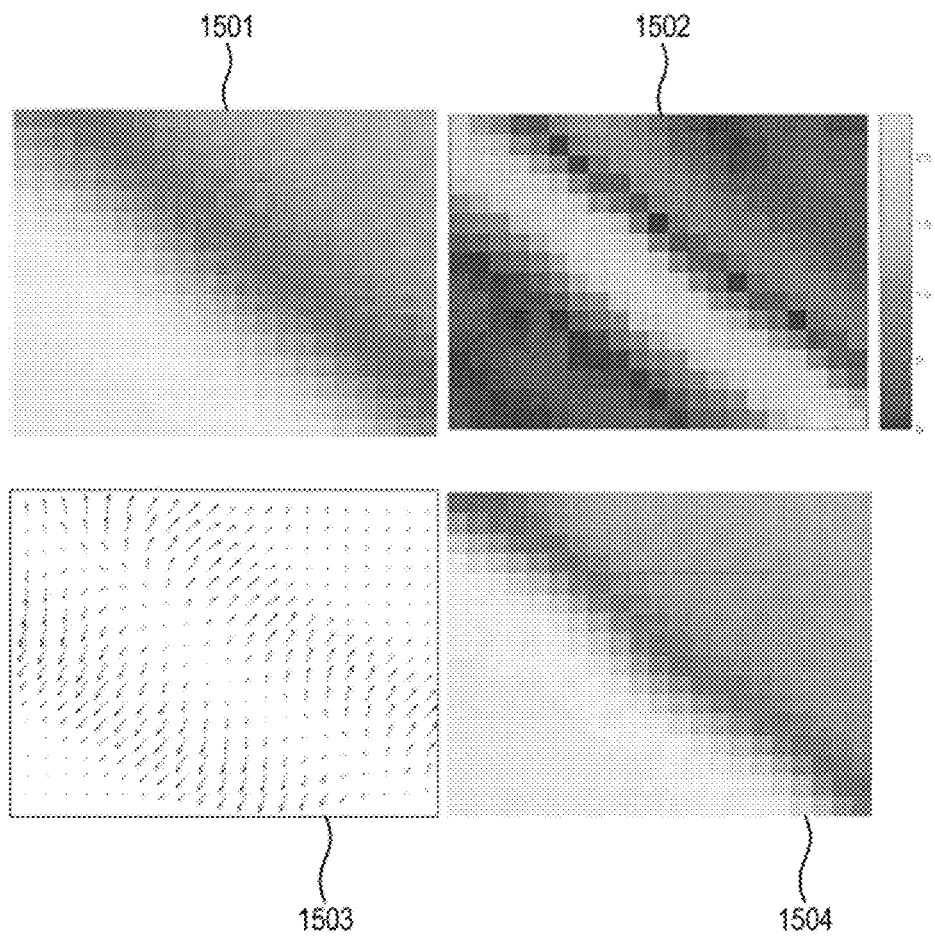
FIG. 15 illustrates a processing sequence and a processing result by the display apparatus according to an exemplary embodiment.

FIG. 15 illustrates a process and a result according to an embodiment of the disclosure where the pixels are placed on a second order coordinate.

When an image 1501 is input, the processor 202 of the display apparatus identifies the pixel value differences or the gradient for each pixel of the input image (1502). Then, the processor 202 can generate a vector for each pixel according to the change degree and the change direction of the pixel value differences (1503). As the pixel value of each pixel is changed into a value of a reference pixel to which the generated vector for each pixel directs, the output image 1504 is obtained. Comparing the output image 1504 with the input image 1501, it can be seen that the image details are enhanced where an edge area of dark colors becomes thin and clear.

Figure 17:
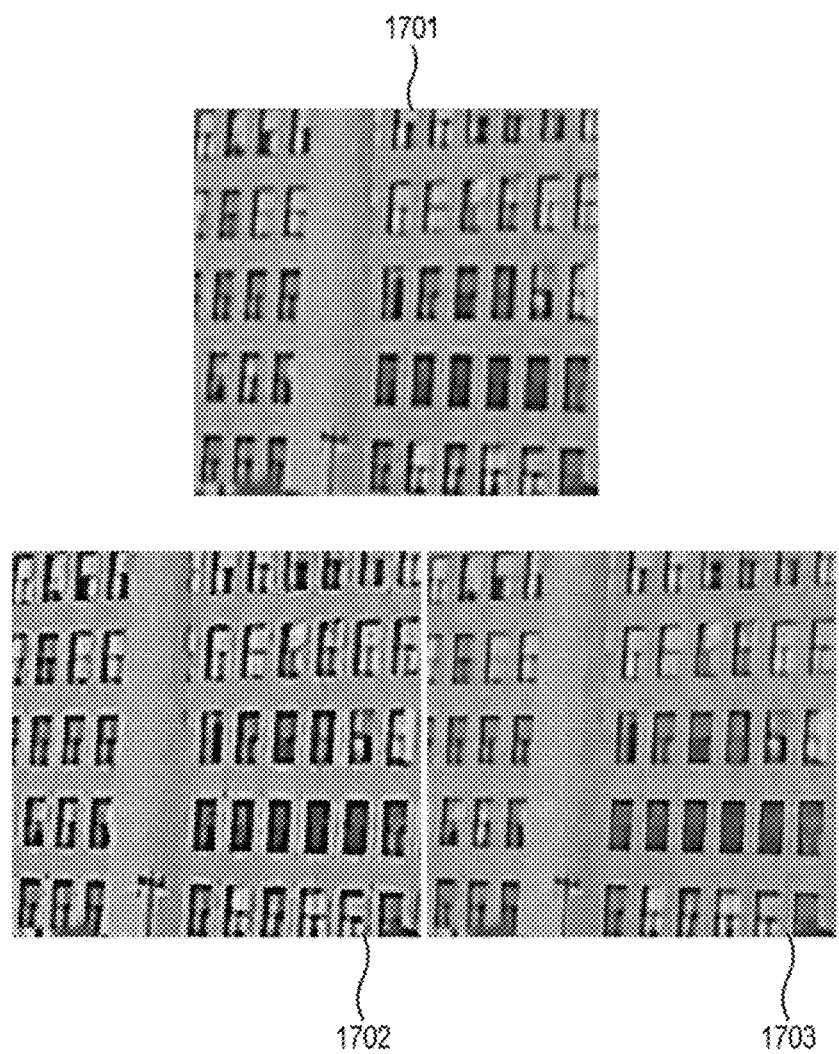
FIG. 17 illustrates an effect of compensating by the display apparatus according to an exemplary embodiment.

Using FIGS. 16 and 17, an effect where an embodiment of the disclosure is all applied to an image can be understood in comparison with a conventional art. Referring to FIGS. 16 and 17, in contrast to images 1602 and 1702 which are applied with a conventional unsharp masking for input images 1601 and 1701, it can be understood in images 1603 and 1703 which are applied with an embodiment of the disclosure that the image details are enhanced while the noises are rarely generated or increased.

Meanwhile, in an embodiment to change the pixel value based on the change degree and the change direction of the pixel value differences between the pixel groups, the change can be performed multiple times varying a size of the pixel groups for a single input image.

Figure 18:
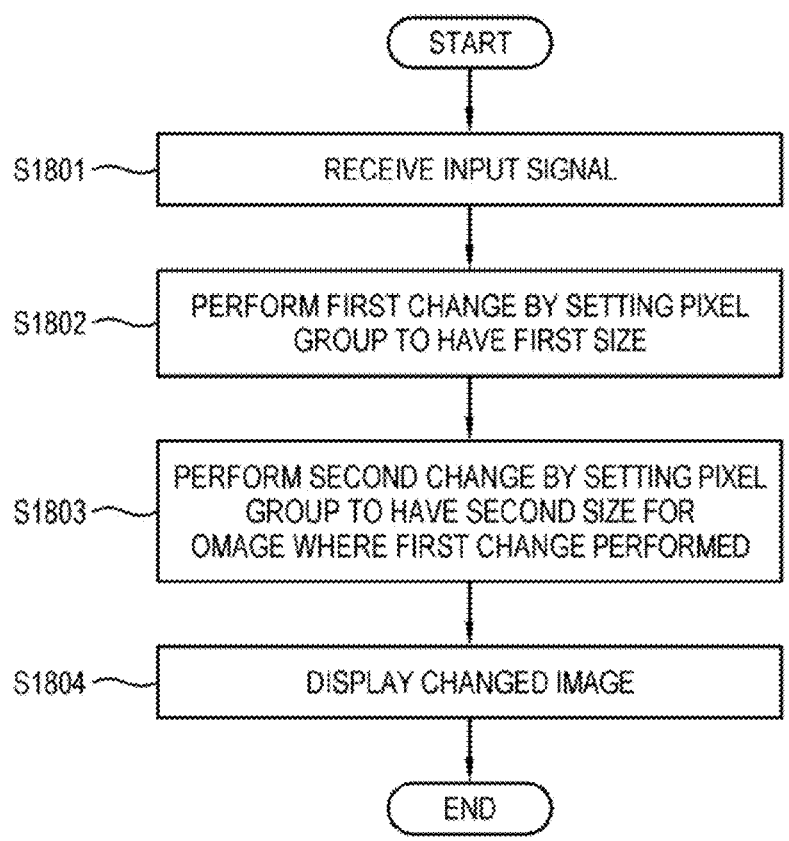
FIG. 18 illustrates a control method of the display apparatus according to an another exemplary embodiment.

In detail, referring to FIG. 18, the processor 202 receives an input signal (S1801), and performs a first change by setting a pixel group to have a first size in changing the pixel value of the first pixel based on the change degree and the change direction of the pixel value differences between the two or more pixel groups adjacent to the first pixel (S1802). Then, the processor 202 may perform a second change by setting the pixel group to have a second size for the image where the first change has been performed (S1803), and display the changed image (S1804).

If the change is performed by setting the size of the pixel group to be small, there is an advantage of changing in precision, but the details may be locally deteriorated. Meanwhile, if the change is performed by setting the size of the pixel group to be large, an effect of the change in a precise area may be relatively small, but the deterioration of the details can be lessened in view of an overall image. Therefore, by combining the two, there is an effect of reducing the disadvantage where only one of the two is applied.

On the other hand, the above embodiments where the change degree and the change direction of the pixel value differences are obtained at the same time or the change direction is calculated after calculating the change degree have been described. However, it is possible that the change degree is calculated after calculating the change direction.

Figure 19:
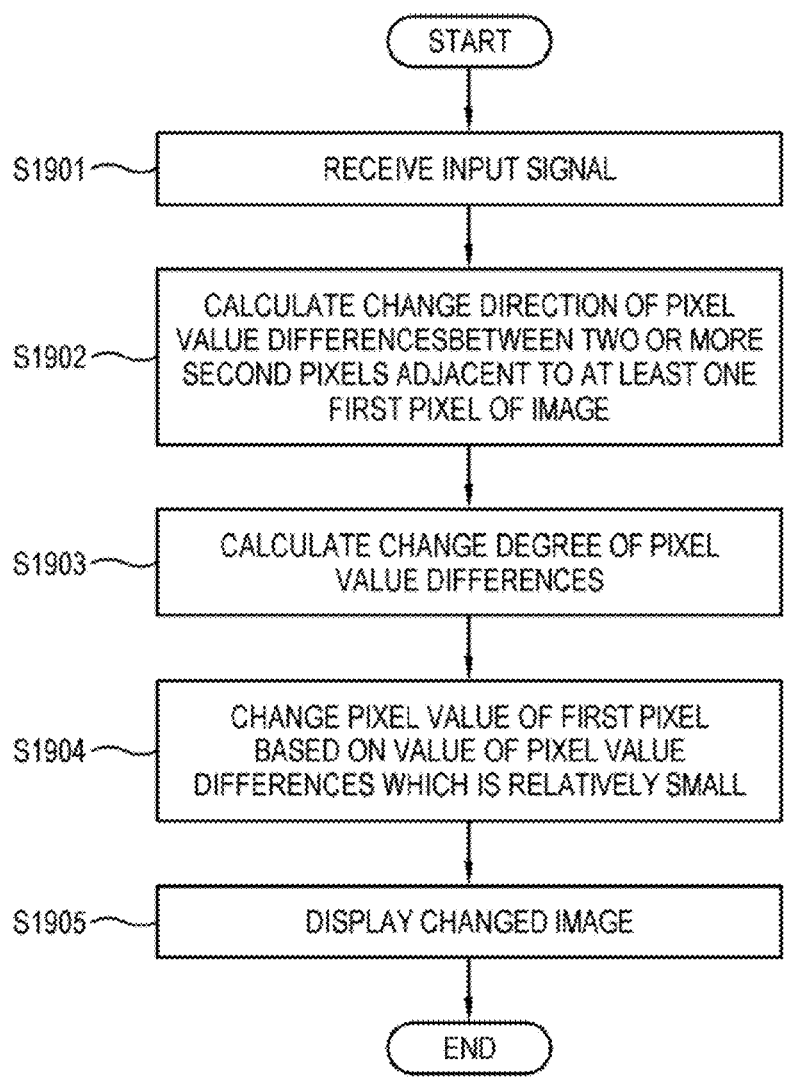
FIG. 19 illustrates a control method of the display apparatus according to an another exemplary embodiment.

Referring to FIG. 19, the processor 202 according to another embodiment receives an input signal (S1901), in changing the pixel value of the at least first pixel of the image based on the change degree and the change direction of the pixel value differences between the two or more second pixels adjacent to the first pixel, calculates the change direction in advance (S1902) and then calculates the change degree (S1903). Then, the processor 202 may change the pixel value of the first pixel based on a value of pixel value differences which is relatively small (S1904), and display the changed image (S1905).

As an example of a way to calculate the change degree of the pixel value differences after calculating the change direction, the change direction is calculated based on a result of performing a low frequency filtering on the pixel value differences and then the change degree is calculated. This will be described in detail referring to FIG. 20.

Because if an embodiment of the disclosure where the change degree and the change direction are identified rather locally is applied to an input signal 2001, the change direction might be calculated in an opposite direction for detail enhancement, an embodiment that it may be possible to calculate the change degree and the change direction of the pixel value differences using the pixel group has been described referring to FIGS. 8 and 9.

According to an embodiment to calculate the change degree after calculating the change direction, it is possible to solve the above problem without using the pixel group. Specifically, it is possible to solve the above problem by calculating the change direction based on a result of performing low frequency filtering on the pixel value differences. For example, it is possible to obtain a graph 2003 by applying a low pass filter on a derivative 2002 which indicates the pixel value differences for each pixel of an input signal 2001. Because the graph 2003 shows a change shape of the pixel value differences in view of the overall image in contrast to a graph of the derivative 2002, it is possible to solve a problem which may occur due to rather locally identifying the change degree and the change direction. That is, because if the change direction is calculated based on a result of performing the low frequency filtering on the pixel value differences, it is possible to divide the high frequency area and the low frequency area in view of the overall image, a direction from the high frequency area towards the low frequency area can be calculated more precisely and reliability can be enhanced.

The invention claimed is:

1. A display apparatus comprising:
   a signal receiver configured to receive an image signal;
   a display configured to display an image;
   a processor configured to:
     calculate a change degree and a change direction of pixel value differences between at least one first pixel and two or more second pixels of an image,
     change a pixel value of the first pixel based on the pixel value difference which is relatively small among the pixel value differences obtained by the calculated change degree and the calculated change direction,
     identify, based on the calculated change degree and the calculated change direction of the pixel value differences, a third pixel which is placed in a direction where the pixel value differences decrease, and
     change the pixel value of the first pixel based on the identified third pixel.

2. The display apparatus according to claim 1, wherein the processor is further configured to change the pixel value of the first pixel by changing the pixel value of the first pixel into a pixel value of the identified third pixel.

3. The display apparatus according to claim 1, wherein the processor is further configured to:
   change the pixel value of the first pixel adjacent to the second pixel in which the pixel value difference is more than a predetermined value, and
   not change the pixel value of the first pixel adjacent to the second pixel in which the pixel value difference is less than the predetermined value.

4. The display apparatus according to claim 1, wherein the processor is further configured to change the pixel value of the first pixel based on the calculated change degree and the calculated change direction of the pixel value differences between two or more pixel groups each of which includes the second pixels.

5. The display apparatus according to claim 4, wherein the processor is further configured to, in calculating the pixel value differences in each of the pixel groups, vary a weight according to closeness to the first pixel.

6. The display apparatus according to claim 4, wherein the processor is further configured to:
   perform a first change by setting the pixel group to have a first size, and
   perform a second change by setting the pixel group to have a second size on the image where the first change has been performed.

7. The display apparatus according to claim 1, wherein the processor is further configured to calculate the change degree of the pixel value differences after calculating the change direction of the pixel value differences.

8. The display apparatus according to claim 7, wherein the processor is further configured to calculate the change direction of the pixel value differences based on a result of performing a low pass filtering on the pixel value differences.

9. A method of controlling a display apparatus, the method comprising:
   receiving an image signal;
   calculating a change degree and a change direction of pixel value differences between at least one first pixel and two or more second pixels of an image,
   changing a pixel value of the first pixel based on the pixel value difference which is relatively small among the pixel value differences obtained by the calculated change degree and the calculated change direction;
   identifying, based on the calculated change degree and the calculated change direction of the pixel value differences, a third pixel which is placed in a direction where the pixel value difference decrease;

changing the pixel value of the first pixel based on the identified third pixel, and displaying the changed image.

10. The method according to claim 9, wherein the changing comprises changing the pixel value of the first pixel by changing the pixel value of the first pixel into a pixel value of the identified third pixel.

11. The method according to claim 9, wherein the changing comprises:

changing the pixel value of the first pixel adjacent to the second pixel in which the pixel value difference is more than a predetermined value, and not changing the pixel value of the first pixel adjacent to the second pixel in which the pixel value difference is less than the predetermined value.

12. The method according to claim 9, wherein the changing comprises changing the pixel value of the first pixel based on the calculated change degree and the calculated change direction of the pixel value differences between two or more pixel groups each of which includes the second pixels.

13. A non-transitory computer-readable medium storing a computer program to execute the method of the display apparatus according to claim 9.

* * * * *